United States Patent [19]

Yamanaka et al.

[11] Patent Number: 5,718,035
[45] Date of Patent: Feb. 17, 1998

[54] MANUFACTURING METHOD OF THIN FILM MAGNETIC HEADS

[75] Inventors: Noboru Yamanaka; Shunichi Katase, both of Nagano, Japan

[73] Assignee: TDK Corporation, Tokyo, Japan

[21] Appl. No.: 595,923

[22] Filed: Feb. 6, 1996

[30] Foreign Application Priority Data

Mar. 2, 1995 [JP] Japan .................................... 7-066714

[51] Int. Cl.⁶ .................................................. G11B 5/127
[52] U.S. Cl. ...................... 29/603.1; 29/417; 29/603.12; 29/603.16; 29/DIG. 15; 360/103
[58] Field of Search ............................ 29/603.07, 603.12, 29/603.16, 417, DIG. 15, DIG. 19; 360/103, 123, 126; 451/41, 408

[56] References Cited

U.S. PATENT DOCUMENTS

| | | | |
|---|---|---|---|
| 4,226,018 | 10/1980 | Nakanishi et al. | 29/603.12 |
| 4,333,229 | 6/1982 | Ellenberger | 29/603.12 |
| 4,489,484 | 12/1984 | Lee | 29/603.16 X |
| 5,095,613 | 3/1992 | Hussinger et al. | 29/603.17 |
| 5,321,882 | 6/1994 | Zarouri et al. | 29/603.12 X |
| 5,406,694 | 4/1995 | Ruiz | 29/603.07 |

FOREIGN PATENT DOCUMENTS

| | | | |
|---|---|---|---|
| 0 463 765 A2 | 1/1992 | European Pat. Off. | 29/603.07 |
| 3-295017 | 12/1991 | Japan . | |
| 2 287 353 | 9/1995 | United Kingdom . | |

OTHER PUBLICATIONS

"IBM 3370 Film Head Design and Fabrication" by Robert Jones, Jr., IBM Disk Storage Technology, Feb. 1980, pp. 6–9.

Primary Examiner—Peter Vo
Attorney, Agent, or Firm—Nikaido Marmelstein Murray & Oram, LLP.

[57] ABSTRACT

A method for manufacturing a thin film magnetic head includes a step of preparing a wafer with a thickness greater than a desired slider length for the magnetic head, a step of forming a plurality of thin film magnetic head elements on one surface of the wafer, a step of slicing the wafer to obtain a plurality of bars so that each of the bars includes a plurality of the thin film magnetic head elements, and a step of longitudinally cutting each of the bars in parallel with a first side face of the bar, on which the thin film magnetic head elements are formed, to remove a portion of the bar at the side of a second side face which is opposed to the first side face so that a length of the bar becomes equal to the desired slider length for the magnetic head.

4 Claims, 3 Drawing Sheets

MANUFACTURING METHOD OF THIN FILM MAGNETIC HEADS

FIELD OF THE INVENTION

The present invention relates to a method for manufacturing a flying type thin film magnetic head.

DESCRIPTION OF THE RELATED ART

When fabricating thin film magnetic heads, in general, at least one wafer (substrate) having a thickness equal to a length of sliders (length between the front edge and the rear edge of the slider) of the magnetic heads is prepared. On the wafer, a matrix of magnetic head elements (read/write transducer elements) substantially consisting of for example magnetic poles, coils and electrical leads are formed by using a thin film technology. Then, the wafer is cut in a plurality of rectangular sliced blocks (bars) so that each of the bars includes a plurality of magnetic head elements aligned in a single-row. Thereafter, one surface of each of the bars is subjected to grinding and lapping processes to shape rails and air bearing surfaces of the sliders, and then individual magnetic heads are obtained. Such magnetic head manufacturing method, particularly slider forming process is described for example in Japanese unexamined Patent Publication No. 3 (1991)-295017.

Recently, such slider of the magnetic head has gone on downsizing. Namely, the length of the slider has been reduced from 3.2 mm (70% slider under the IDEMA standard) or from 2.0 mm (50% slider under the IDEMA standard) to 1.25 mm (30% slider under the IDEMA standard) or to 1.0 mm or less.

In order to shorten the slider length, according to the conventional art, a correspondingly thinner wafer has to be used. However, if the wafer is too thin, it tends to bow or bend toward the thickness direction of the wafer causing dimension precision of the formed slider to extremely deteriorate.

There is an another problem in the conventional slider forming process due to thin sliced bars.

FIG. 1 shows a thin rectangular shaped block (bar) 11 sliced from a wafer so as to include a plurality of magnetic head elements 10 aligned in a single-row. If the wafer is sliced to thin bar with a thickness of for example t=0.3 mm, the thin sliced bar may bow toward a gap-depth direction of the magnetic head elements 10 (Z-direction in FIG. 1). This is serious problem because the gap-depth is one of important factors for determining the electromagnetic conversion characteristics of the magnetic head. If the bar bows toward the gap-depth direction, the conversion characteristics will greatly deviate causing a yield of the magnetic head to extremely decrease.

As one solution to prevent the bar to bow toward the gap-depth direction, an aging method for heating once the bar and then for gradually cooling it is described in the aforementioned Japanese unexamined Patent Publication No. 3(1991)-295017.

As an another solution to prevent the bar to bow toward the gap-depth direction, a method for cutting the wafer in a plurality of bars so that each of the bars includes a plurality of magnetic head elements aligned in double-rows is described in U.S. Pat. No. 5,095,613.

According to the above-mentioned conventional methods, it is possible to substantially prevent the bar from bowing or bending toward the gap-depth direction (Z-direction in FIG. 1). However, these conventional methods cannot prevent the previously mentioned problem of bowing or bending of the thin wafer toward its thickness direction (Y-direction in FIG. 1).

FIG. 2 shows Y-direction bend characteristics of the bar 11 shown in FIG. 1 with respect to X-direction distance from the origin. In the figure, a solid line indicates Y-direction bend characteristics of a bar sliced from a wafer with a general thickness of (L=) 2.0 mm and a broken line indicates Y-direction bend characteristics of a bar sliced from a thin wafer with a thickness of (L=) 1.2 mm. As will be understood from this figure, since the wafer has the thickness of 2.0 mm or more up to now, the Y-direction bend is so small that there occurs no problem due to the Y-direction bend. However, in case of manufacturing short length sliders having a length of less than 2.0 mm, for example small sliders having a length of 1.2 mm, this large Y-direction bend becomes very serious problem. No solution against this problem has been found out now. If the bar bows or bends toward the thickness direction of the wafer (Y-direction), dimension precision of rails formed on the sliders will extremely deteriorate causing a yield of the magnetic heads to decrease with a great extent.

SUMMARY OF THE INVENTION

It is therefore an object of the present invention to provide a method for manufacturing a thin film magnetic head, whereby its slider can be formed with keeping a high dimension precision in spite of downsizing.

Another object of the present invention is to provide a method for manufacturing a thin film magnetic head, whereby a yield of the magnetic heads can be kept in high in spite of downsizing.

According to the present invention, a method for manufacturing a thin film magnetic head includes a step of preparing a wafer with a thickness greater than a desired slider length for the magnetic head, a step of forming a plurality of thin film magnetic head elements on one surface of the wafer, a step of slicing the wafer to obtain a plurality of bars so that each of the bars includes a plurality of the thin film magnetic head elements, and a step of longitudinally cutting each of the bars in parallel with a first side face of the bar, on which the thin film magnetic head elements are formed, to remove a portion of the bar at the side of a second side face which is opposed to the first side face so that a length of the bar becomes equal to the desired slider length for the magnetic head.

Since a wafer of a thickness more than a desired slider length is used, no bend toward the wafer thickness occurs, resulting no defective sliders in dimension due to this direction bend. Thus, rails and other contour of the slider can be formed with keeping a high dimension precision in spite of downsizing causing a yield of the magnetic heads to be kept in high. Furthermore, manufacturing processes of the magnetic head will not be complicated because it is not necessary to modify the conventional manufacturing processes except for adding a simple process for longitudinally cutting the bar in parallel with the head elements formed face so as to remove the cut portion disposed at the side of the other face which is opposed to the head elements formed face.

It is preferred that the slicing step includes a step of slicing the wafer to obtain a plurality of bars so that each of the bars includes a plurality of the thin film magnetic head elements aligned in a single-row.

The method may further include a step of grinding one surface of each of the bars to form a desired contour of the bar, and a step of lapping the ground surface of each of the bars to obtain a desired throat height of the magnetic heads.

Further objects and advantages of the present invention will be apparent from the following description of the preferred embodiments of the invention as illustrated in the accompanying drawings.

DESCRIPTION OF THE PREFERRED EMBODIMENTS

According to a preferred embodiment of the present invention, a small thin film magnetic head with a slider length of 1.25 mm is fabricated. First, a wafer 30 having a thickness greater than the desired slider length of 1.25 mm, for example a wafer with a thickness of 2.0 mm is prepared. Then, as shown in left half part of FIG. 3, on one surface of the wafer 30, a matrix of thin film magnetic head elements (read/write transducer elements) 31 are formed by using a thin film technology.

Figure 3:
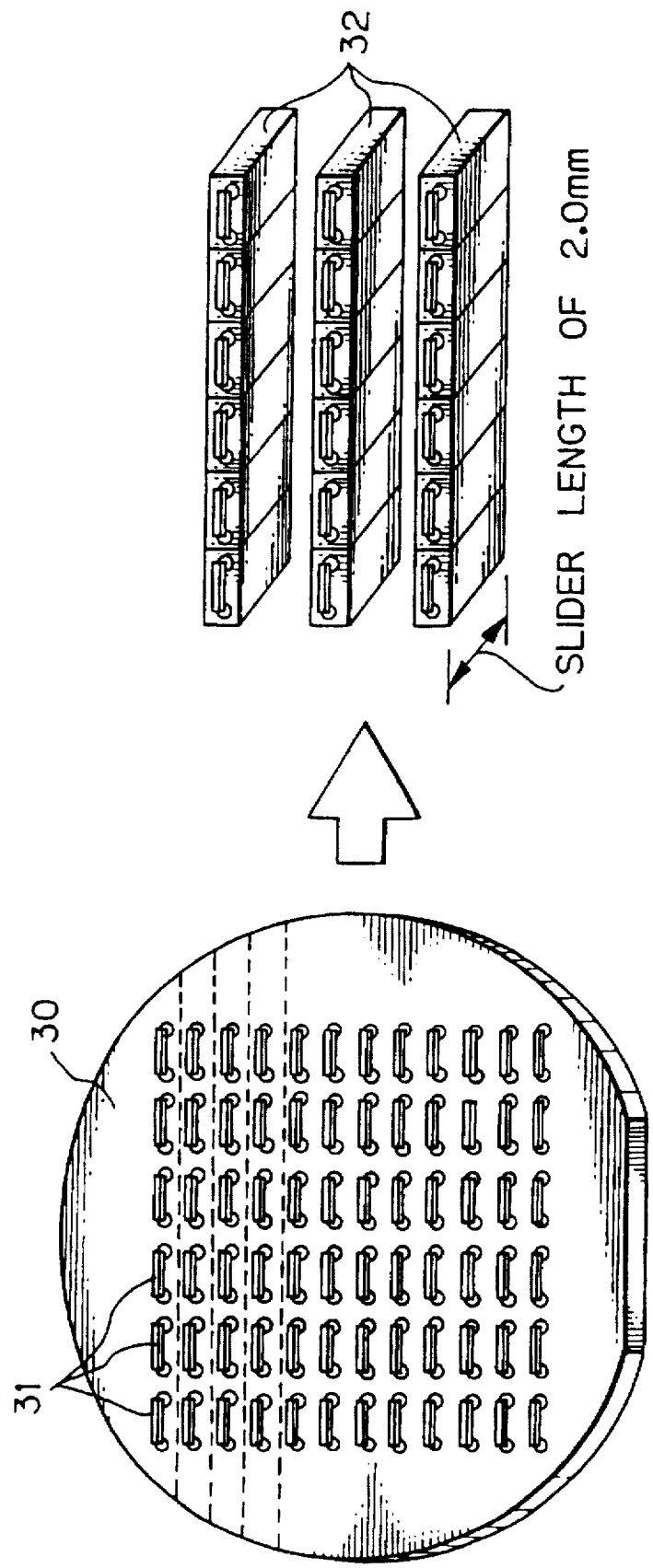
FIGS. 3 to 6 show oblique views illustrating parts of manufacturing processes of a preferred embodiment according to the present invention.

Then, as shown in right half part of FIG. 3, the wafer 30 is cut in a plurality of rectangular sliced blocks (bars) 32 so that each of the bars 32 includes a plurality of the thin film magnetic head elements 31 aligned in a single-row.

Figure 4:
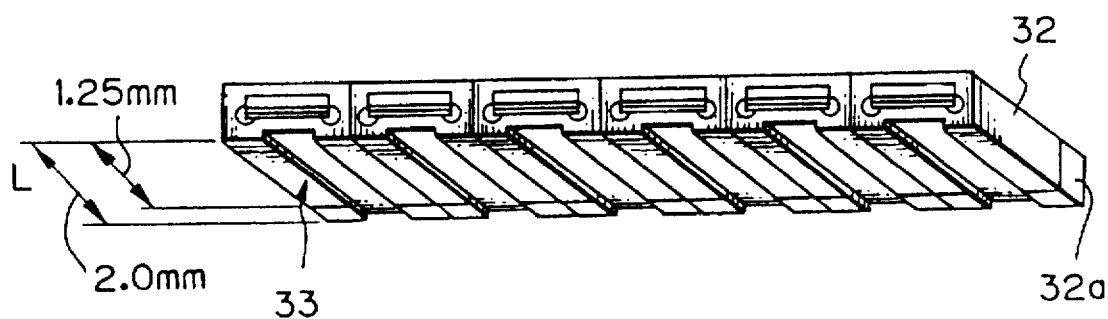

Thereafter, as shown in FIG. 4, one surface of each of the sliced bars 32 is subjected to a grinding process to shape contour such as two rails, and the air bearing surfaces (ABSs) 33 of the rails are subjected to a lapping process to obtain a desired throat height. At this step, as shown in FIG. 4, the slider length (bar length) L is 2.0 mm as long as the wafer thickness.

Figure 5:
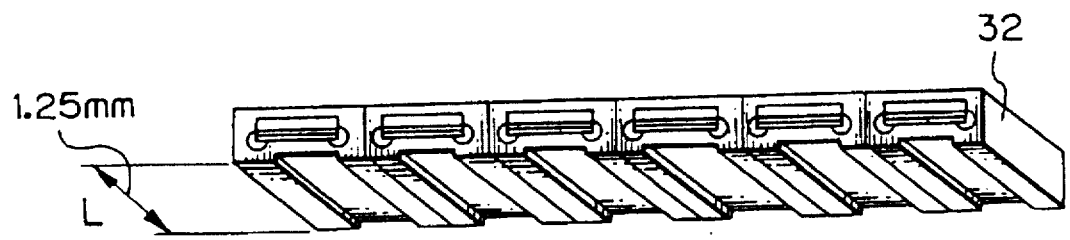

Then, the slider length (bar length) L is shortened to L=1.28 mm by longitudinally cutting the bar 32 in parallel with a side face on which the thin film magnetic head elements 31 are formed (head elements formed face) and by removing the cut portion 32a disposed at the side of the other side face which is opposed to the head elements formed face. The bar 32 with the slider length (bar length) L=1.25 mm after the cutting off process is shown in FIG. 5.

Figure 6:
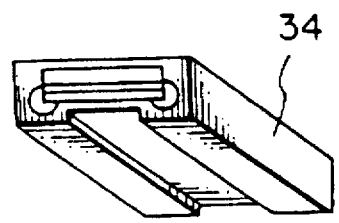

Thereafter, by performing the similar processes as the conventional manufacturing processes, a separated individual magnetic head 34 with the slider length of 1.25 mm shown in FIG. 6 can be finally obtained.

In the aforementioned embodiment, the cutting off process for shortening the bar length to the desired value is performed after the lapping process of the ABS 33. According to the present invention, however, this cutting off process may be carried out before the lapping process or the grinding process but must be carried out after the slicing process from the wafer 30 to the bars 32.

Figure 1:
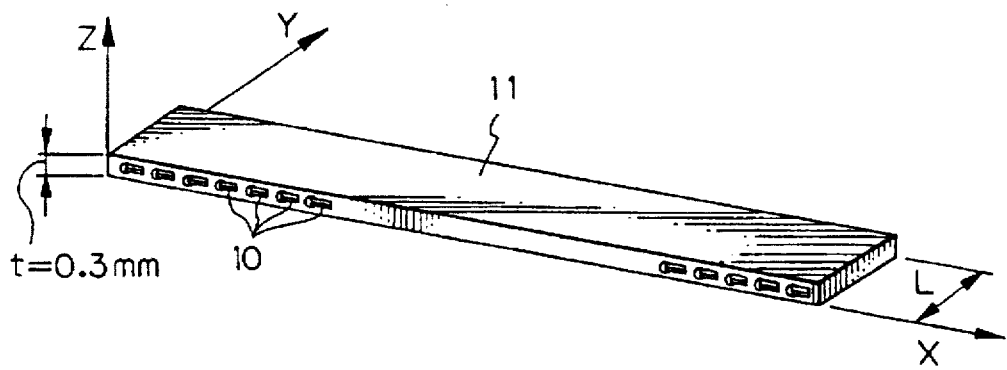
FIG. 1 shows an oblique view of the bar sliced from the wafer.
Figure 2:
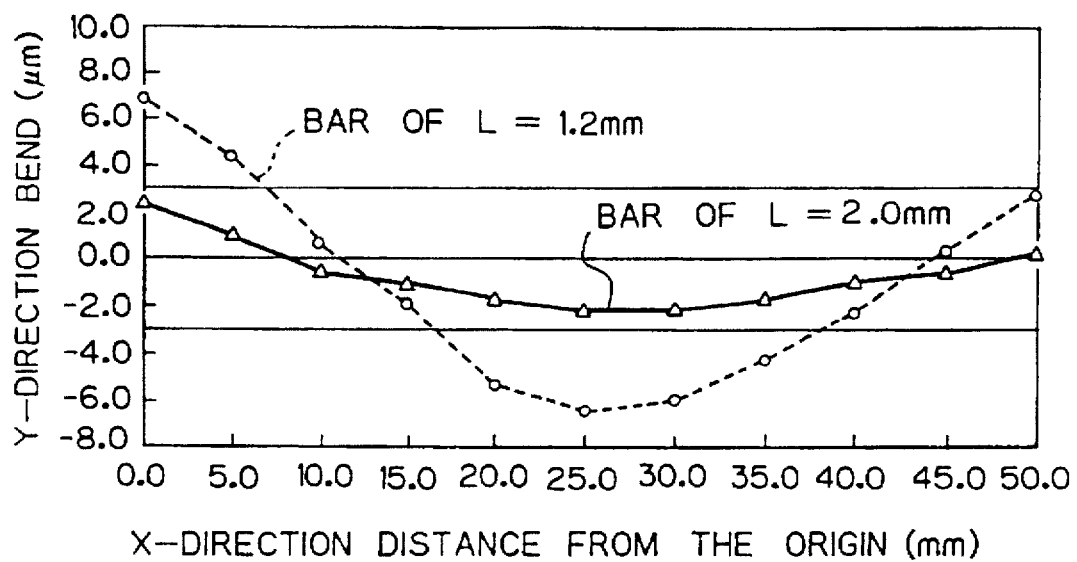
FIG. 2 shows Y-direction bend characteristics of the bar shown in FIG. 1.

As the thick wafer 30 (=2.0 mm) is used according to this embodiment, the amount of possible bowing or bending of the bar toward the thickness direction of the wafer in other words bending toward the slider-length direction (Y-direction bend) will not increase even if small dimension sliders are to be fabricated. This will be apparent from FIG. 2 wherein it is indicated that the amount of bending when using a wafer with the thickness of 2.0 mm is about one third of that when using a wafer with the thickness of 1.2 mm.

In order to fabricate a small magnetic head provided with a short slider length of for example 1.25 mm or 1.2 mm and with a desired dimension precision of the rails, the Y-direction bend has to be controlled within a range between −3 μm and +μm. If a wafer of 1.2 mm thickness is used, as will be apparent from FIG. 2, the portion of about 60% length in X-direction of the bar sliced from the wafer may be out of the above-mentioned range causing the yield of the sliders to extremely decrease. However, according to this embodiment, since the wafer of 2.0 mm thickness is used, no Y-direction bend over the above-mentioned range occurs, as will be apparent from FIG. 2, resulting no defective sliders in dimension due to the Y-direction bend. Thus, rails and other contour of the slider can be formed with keeping a high dimension precision in spite of downsizing causing a yield of the magnetic head to be kept in high. Furthermore, manufacturing processes of the magnetic head will not be complicated because it is not necessary to modify the conventional manufacturing processes except for adding a simple process for cutting the bar in parallel with the head elements formed face so as to remove the cut portion disposed at the side of the other face which is opposed to the head elements formed face.

In general, a marker indicating for example an identifying number or a rot number of a thin film magnetic head is previously written on the opposite face of its head elements formed face. According to the present invention, since this opposite face on which the marker is to be written is eliminated by the cutting off process, the marker should be written on the opposite face after the cutting off process or on the head elements formed face of the slider.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for manufacturing a thin film magnetic head, comprising the steps of:

preparing a wafer having first and second opposed side faces defining a thickness therebetween greater than a desired slider length of a magnetic head to be manufactured;

forming a plurality of thin film magnetic head elements on said first side surface of said wafer;

slicing said wafer in the direction perpendicular to said side faces, thereby obtaining a plurality of bars, each of said bars including a plurality of the thin film magnetic head elements;

longitudinally cutting each of said bars in parallel with said first side face, on which said thin film magnetic head elements are formed, thereby removing a portion of said bar at the side of said second side face, thereby producing a plurality of bars each having a length equal to the desired slider length of the magnetic head to be manufactured; and cutting the bars having the desired length in a direction perpendicular to the slicing direction, thereby producing the thin film magnetic heads.

2. The method as claimed in claim 1, wherein said slicing step includes a step of slicing said wafer to obtain a plurality of bars so that each of said bars includes a plurality of the thin film magnetic head elements aligned in a single-row.

3. The method as claimed in claim 1, wherein said method further comprises a step of grinding one surface of each of said bars to form a desired contour of the bar.

4. The method as claimed in claim 3, wherein said method further comprises a step of lapping the ground surface of each of said bars to obtain a desired throat height of the magnetic heads.

* * * * *